United States Patent
Birnbaum et al.

(10) Patent No.: US 10,685,181 B2
(45) Date of Patent: Jun. 16, 2020

(54) LINGUISTIC EXPRESSION OF PREFERENCES IN SOCIAL MEDIA FOR PREDICTION AND RECOMMENDATION

(71) Applicant: Northwestern University, Evanston, IL (US)

(72) Inventors: Lawrence A. Birnbaum, Evanston, IL (US); Shawn O'Banion, Chicago, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 0 days.

(21) Appl. No.: 14/199,079

(22) Filed: Mar. 6, 2014

(65) Prior Publication Data

US 2014/0257795 A1    Sep. 11, 2014

Related U.S. Application Data

(60) Provisional application No. 61/773,498, filed on Mar. 6, 2013.

(51) Int. Cl.
G06Q 30/02 (2012.01)
G10L 15/18 (2013.01)
G06F 40/279 (2020.01)

(52) U.S. Cl.
CPC ......... *G06F 40/279* (2020.01); *G06Q 30/02* (2013.01); *G10L 15/1822* (2013.01)

(58) Field of Classification Search
CPC .......................... G06Q 30/02; G10L 15/1822
See application file for complete search history.

(56) References Cited

U.S. PATENT DOCUMENTS

| | | | | |
|---|---|---|---|---|
| 7,567,958 B1 * | 7/2009 | Alspector | ......... | G06F 17/30867 |
| 8,386,486 B2 * | 2/2013 | Zhang | ..................... | G06F 16/90 |
| | | | | 707/737 |
| 9,418,075 B2 * | 8/2016 | Jones | ................ | G06F 17/30241 |
| 9,565,236 B2 * | 2/2017 | Harz | ..................... | G06N 20/00 |
| 2004/0210661 A1 * | 10/2004 | Thompson | ............ | G06Q 30/02 |
| | | | | 709/228 |
| 2007/0078642 A1 | 4/2007 | Weng et al. | | |
| 2008/0021859 A1 * | 1/2008 | Berkhin | ............ | G06F 17/30221 |
| 2008/0133488 A1 * | 6/2008 | Bandaru | ............ | G06F 17/30864 |
| 2008/0209343 A1 * | 8/2008 | Macadaan | ............. | G06F 3/0482 |
| | | | | 715/747 |
| 2009/0164267 A1 * | 6/2009 | Banatwala | ............. | G06Q 10/08 |
| | | | | 707/736 |
| 2010/0076968 A1 * | 3/2010 | Boyns | ............... | G06F 17/30241 |
| | | | | 707/732 |
| 2010/0161385 A1 * | 6/2010 | Karypis | ................. | G06Q 10/04 |
| | | | | 705/7.31 |
| 2010/0169317 A1 | 7/2010 | Wang et al. | | |

(Continued)

OTHER PUBLICATIONS

International Search Report and Written Opinion for PCT/US14/21249, dated Jul. 8, 2014, 8 pages.

*Primary Examiner* — Bryan S Blankenagel
(74) *Attorney, Agent, or Firm* — Benesch, Friedlander, Coplan & Aronoff LLP

(57) ABSTRACT

Disclosed herein are systems, methods and computer readable storage media for determining tags or labels from natural language expressions expressing a preference or choice, determining attributes from natural language expressions and other data, and predicting preferences from natural language expressions and other data.

25 Claims, 5 Drawing Sheets

(56) References Cited

U.S. PATENT DOCUMENTS

| | | | |
|---|---|---|---|
| 2010/0205541 A1* | 8/2010 | Rapaport | G06Q 10/10 715/753 |
| 2010/0205628 A1* | 8/2010 | Davis | H04N 21/478 725/25 |
| 2010/0312724 A1* | 12/2010 | Pinckney | G06N 99/005 706/11 |
| 2011/0066615 A1* | 3/2011 | Pradhan | G06F 17/30699 707/737 |
| 2011/0218948 A1* | 9/2011 | De Souza | G06F 15/16 706/12 |
| 2011/0270676 A1* | 11/2011 | Vassilvitskii | G06Q 30/02 705/14.49 |
| 2011/0302117 A1* | 12/2011 | Pinckney | G06Q 30/02 706/12 |
| 2011/0320276 A1* | 12/2011 | Ray | G06Q 30/0255 705/14.53 |
| 2012/0005209 A1* | 1/2012 | Rinearson | G06F 17/30908 707/737 |
| 2012/0191708 A1* | 7/2012 | Barsony | G06Q 10/00 707/737 |
| 2012/0219191 A1* | 8/2012 | Benzarti | G06K 9/00677 382/106 |
| 2012/0221479 A1* | 8/2012 | Schneck, III | G06Q 30/0631 705/347 |
| 2012/0324023 A1 | 12/2012 | Sciullo et al. | |
| 2013/0041653 A1 | 2/2013 | Tseng | |
| 2013/0138644 A1* | 5/2013 | Yahia | G06Q 10/10 707/733 |
| 2013/0173533 A1* | 7/2013 | Nichols | G06F 17/30035 707/609 |
| 2013/0232200 A1* | 9/2013 | Knapp | H04L 67/306 709/204 |
| 2013/0238356 A1* | 9/2013 | Torii | G06Q 10/06 705/2 |
| 2013/0290339 A1* | 10/2013 | LuVogt | G06Q 10/10 707/740 |
| 2014/0224867 A1* | 8/2014 | Werner | H04W 4/80 235/375 |
| 2015/0032824 A1* | 1/2015 | Kumar | H04L 51/06 709/206 |
| 2015/0039693 A1* | 2/2015 | Itamoto | G06F 17/3089 709/204 |
| 2015/0112918 A1* | 4/2015 | Zheng | G06Q 30/02 706/48 |

\* cited by examiner

LINGUISTIC EXPRESSION OF PREFERENCES IN SOCIAL MEDIA FOR PREDICTION AND RECOMMENDATION

CROSS-REFERENCE TO RELATED APPLICATION

This application claims the benefit of U.S. Provisional Application Ser. No. 61/773,498 filed Mar. 6, 2013, the entirety of which is incorporated by reference herein.

STATEMENT OF U.S. GOVERNMENT SUPPORT

This invention was made with government support under grant numbers IIS0917261 IIS0856058 awarded by the National Science Foundation. The government has certain rights in this invention.

BACKGROUND

The size of the Internet can make it difficult to extract useful information from the large amount of available online information. One of the techniques for dealing with the large amount of data available over the Internet is called collaborative filtering. Collaborative filtering is based on the idea that people often get good recommendations from someone with similar tastes to themselves. Collaborative filtering techniques try to match people with similar interests and make recommendations on this basis.

DETAILED DESCRIPTION

Approaches to the automatic prediction of individual or group preferences for recommendation and other purposes can include different kinds of information about a sufficiently large set of individuals. Information associated with those individuals or groups can be used to determine their similarity with other individuals not in the set, and information about the preferences of individuals can be used to set tags or labels indicating preference.

While details of the algorithms and data representations used to form predictions or recommendations using such information may vary, one mechanism includes: Attributes of a new individual, not in the original set, are compared with either the attributes of individuals in the set, or with attributes of composite models based on those individuals. Some measure of similarity is then computed to determine the original individuals or composite models that best match the new individual's description, e.g., attributes. Information about the preferences of the individuals in the initial set, e.g., the tags or labels, can then be ascribed to the new individual, with some degree of certainty or ranking based upon how good the match is. The more a new individual is like other individuals whose preferences are known, the more confident that they too will exhibit those preferences.

In cases for which some systems have been developed, the attributes of individuals and their expressions of preference are the same. This approach is known as collaborative filtering. For example, both may be in the form of explicit ratings of how much the individuals liked movies that they have seen. In that case, one person is similar to another to the extent that their ratings, for a reasonable number of movies that they have both seen, are similar; and when two people are judged as similar in this way, if one has seen and liked a movie that the other has not seen, it can then be predicted that the second person will also like that movie which may subsequently be recommended to them for viewing. In other approaches, the attributes used to describe the individuals may be demographic data, age, gender, occupation, zip code, etc., about those individuals. In many cases, both sorts of information about consumers are used. These approaches, however, can have limitations in that they ask the user to rate things or provide demographic information.

Figure 1:
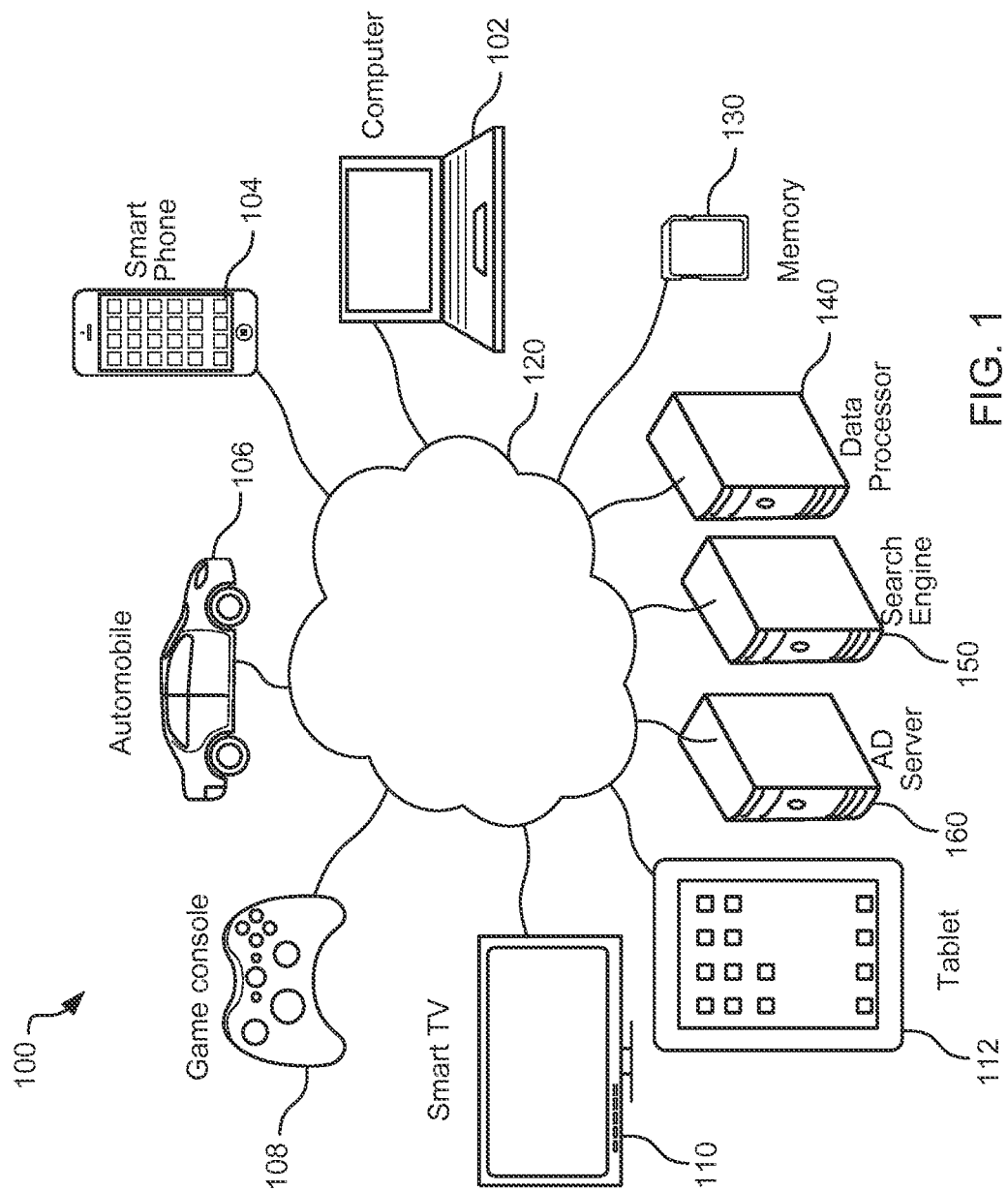
FIG. 1 is a block diagram of an exemplary system to collect and utilize information about users and their preferences.

FIG. 1 is a block diagram of an exemplary system 100 to collect and utilize information about attributes of the users 1-N and their preferences, which does not require asking the users 1-N for ratings or demographic information. Users 1-N can be operating a variety of devices, from personal computers 102, to smart phones 104, in-vehicle communication devices 106, gaming consoles 108, smart televisions 110, tablets 112, etc. The devices 102-112 can connect to a network 120, e.g. via the Ethernet, WiFi, and/or cellular connections, etc. The network 120 can include wide area networks, e.g., the Internet, local area network, metropolitan area networks, and/or system area networks etc. The devices 102-112 can provide location information, e.g., via GPS, cellular networks, Internet Protocol (IP) addresses, etc. The user attributes and preference information can be stored in memory 130 and processed by a data processor 140, as described in more detail below. The memory 130 can be local to the data processor 140 or remotely accessed, e.g., via the network 120. The user attribute and preference information can be used by search engines 150, advertisement servers 160, etc., to serve relevant information to the users 1-N and other users based on their attributes.

The system 100 gathers data that characterizes topics, terms, uniform resource locators (urls), etc. of a number of individual users 1-N (their attributes), and gathers data about their preferences with respect to, for example, particular media content, products, an entity or services, etc. (e.g, tags or labels). Preference data can be gathered for this purpose, and are considered valuable by vendors and advertisers, e.g., ad server 106, both online and offline. The system 100 can gather the attribute and preference information from the users 1-N, e.g., through natural language data sent by users 1-N using social media or other applications, e.g., FACEBOOK, TWITTER, LINKEDIN, FOURSQUARE, VIMEO, GOOGLE+, FLICKR, TUMBLR, SKYPE, YOUTUBE, YELP, MESSENGER, etc.

Companies such as AMAZON can collect a substantial body of data on consumer preferences in the form of actual purchases made by its customers. The companies use these data to make product recommendations to those customers. The data are valuable, and as such are closely held by AMAZON. NETFLIX similarly maintains a large body of movie rental and feedback information for these purposes. Because of the proprietary nature of much customer preference data, it can be difficult for vendors or advertisers who do not hold such data directly to provide the same level of service or personalization.

In addition to or alternative to using, e.g., data about users' behaviors (clicks, purchases, viewing time, etc.) on possibly proprietary e-commerce or web publishing sites, natural language data can be used from individuals posting via social media. The social media data generated, e.g., by people using TWITTER or other social media applications, is often publicly available.

Figure 2:
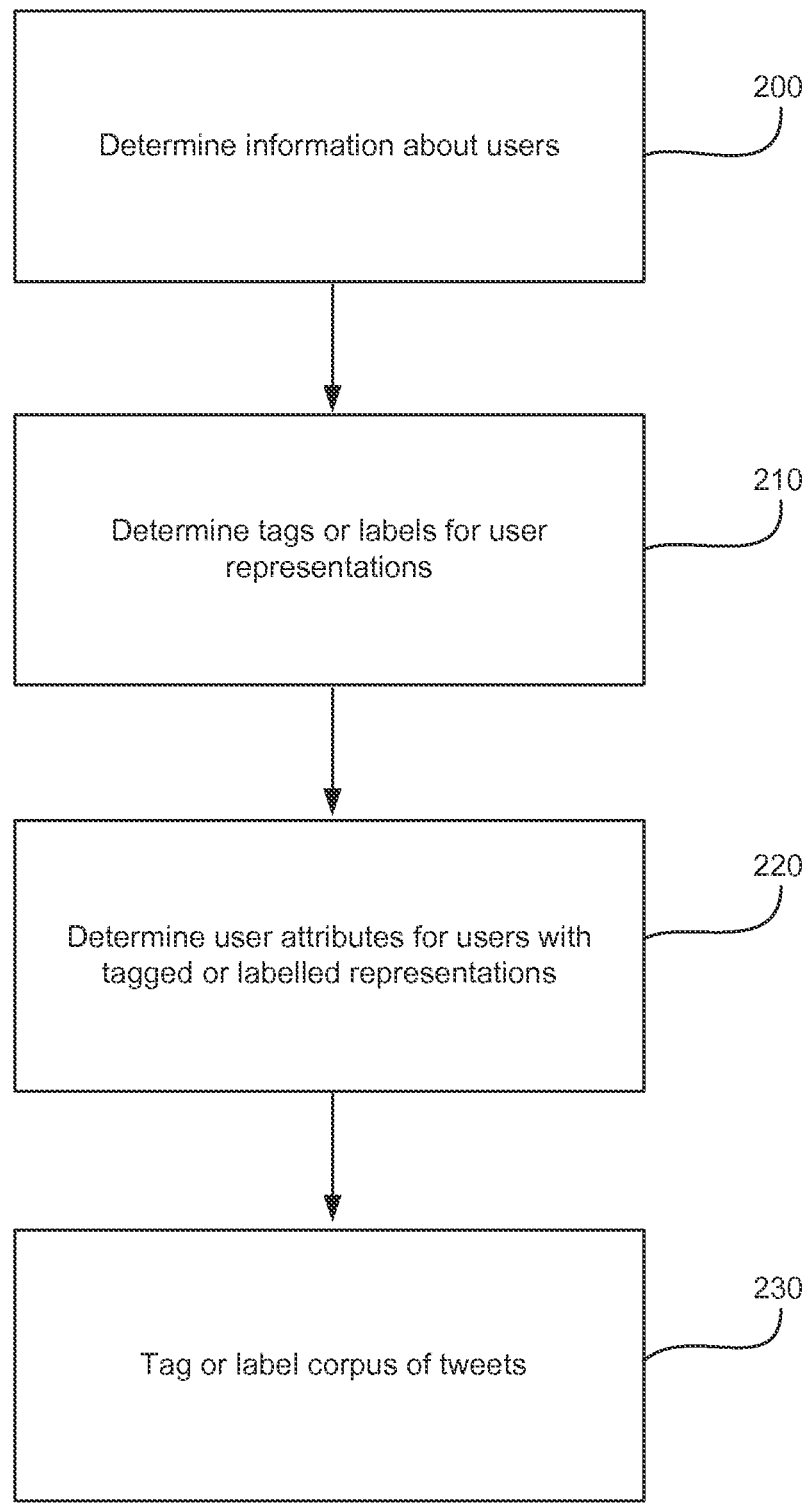
FIG. 2 is a flowchart of an exemplary logic to determine information about users from their social media postings.

FIG. 2 is a flowchart of an exemplary logic to determine information about users 1-N from their social media postings (200), e.g., from tweets and/or other social media postings. Tags or labels indicating preferences of user 1-N can be determined by mining from social media explicit, natural language expressions of preference and/or purchases, or other behavior or sentiments by the users 1-N (210). For example, preferences in books, movies, restaurants, products, etc., can be gathered. Additionally, attributes of the users 1-N as generated via the social media sites are collected, e.g., entire messages, terms, mentions, hash tags, links, etc., (220). In some cases, attribute data can be collected before the users 1-N generate the explicit natural language expression that forms the tag or label (see e.g., FIG. 3). In other cases attribute data can be collected after the tweet or post with the tagged or labelled preference.

In one example, a person's tweet that they have purchased a specific product is used as an indication of their preference for that product. The product name, and/or something derived from it, e.g., the category of product into which it falls, forms the tag or label. In some cases, these tweets are generated automatically, for marketing purposes, by e-commerce vendors when an individual with a known TWITTER username makes a purchase. A determined number of the same person's previous tweets (additionally or alternatively subsequent tweets), as well as other information available about them, are collected to form the attributes of that individual. The attributes can include words by the user, hashtags, usernames, etc. as determined from the user's previous (additionally or alternatively subsequent) tweets. These tweets may be used in raw form as attributes by an ad serving or other algorithm; and/or they may be analyzed to provide, for example, terms that may characterize the tweets of other people who would also be interested in that product. Other data included in the tweets, including so-called @-mentions, as well as website links, may also be used. The information about the users 1-N may include the accounts that they "follow" (in the parlance of TWITTER), or those that follow them, as well as tweets from those accounts.

To form the tags or labels indicating user preferences, the system 100 looks for, e.g., tweets of the form "I bought an X," "I just got an X," "I love my new X," etc., where "X" is the name of some product (or perhaps a product category). When such tweets are automatically generated by an e-commerce site on behalf of a user as the result of a transaction, their identification can be particularly straightforward, since in those cases the form of the expression is fixed.

Figure 4:
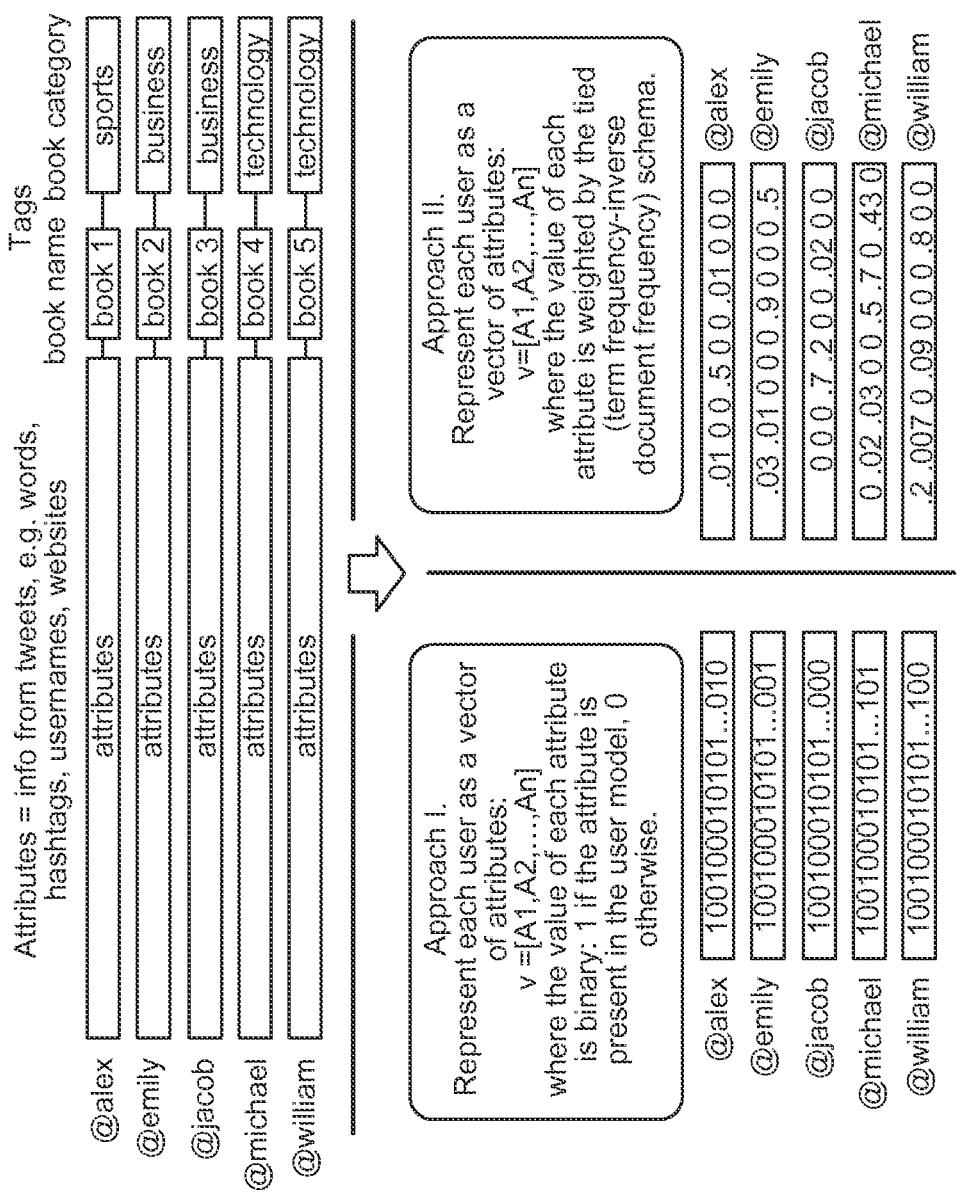
FIG. 4 provides an example of how users or composite models of users are represented.

Once a preference for an individual is determined, this preference is then used to tag or label the corpus of prior tweets (and/or other social media posts and attributes) from the same individual, or some attributes derived from that corpus, as indicating a preference for product X, or for products in that category (230) (see e.g., FIG. 4). Tweets subsequently generated by the individual may also be used as attributes or to derive attributes. Other data about the individual (e.g., demographic information derived from their profiles or locations, or who they "like" or "follow," or who "likes" or "follows" them, and/or tweets from those other individuals, and/or other information about those individuals) may also be included in the attributes so tagged or labeled.

In addition to explicit linguistic expressions of purchase behavior, the system 100 can be focused on expressions of other choice behavior (e.g., voting intentions) to form tags or labels indicating preferences relevant to those choices. Additionally, the approach can be generalized to a range of expressions of preference or opinion about products, services, companies, political or economic positions or candidates, etc. That is, expressions indicating varying sentiments and ranges of sentiments can be used to form the tags or labels indicating preference. Thus the phrases "I love X" or "I hate X," "I have mixed feelings about X," and so on, where X is a product, service, company, politician, proposed law, etc., could be used to form tags or labels indicating a range of sentiments towards those entities. These preferences (tags or labels) could then be ascribed to individuals who have not explicitly uttered them through the same sorts of processes described above (see e.g., FIG. 5).

The basic approach outlined above can be extended in a number of ways. The approach can be language-agnostic: As far as characterizing the attributes of users, it does not matter what language they use, or even whether they use more than one language, or whether the expressions utilized by the system to determine the preferences of users are in the same language(s) as those employed by those users 1-N. The system 100 described above, for example, does not distinguish different languages, and so terms from multiple different languages may end up being used as attributes to determine similarity among users or between users and composite models.

The system 100 may segregate and analyze social media data expressed in different languages separately in determining attributes of individuals or composite models. This may result in increased accuracy, for example, by decreasing ambiguity of the attributes, or because of systematic differences in preference between speakers of different languages. The resulting attributes may still be combined in representing an individual or a composite model, and in assessing similarity, but the decision to use them in combination, and the ways in which they are combined, would be explicit and considered rather than implicit, automatic, and uniform, as in the system 100 described above.

Additionally, machine translation could be used either on raw data (e.g., tweets) or derived attributes (terms or features) in order to increase the amount of data available to represent individuals and/or composite models and to determine similarity even when utilizing attributes from only one given language. For example, users' tweets could be translated from, e.g., French to English, and then the English translations could be used either to help determine (or augment or refine) the attribute sets used for prediction (if the user's preferences were known), or could be used to determine the user's preferences through comparison with known individuals or composite models the attributes of which are expressed as English terms. Additionally or alternatively, the terms used to express the attributes of known users or composite models could be translated from, e.g., English to Arabic, and then the resulting Arabic-language attribute descriptions could be used to determine the preferences of users who express themselves in Arabic.

Similarly, the expressions indicating preferences utilized by the system to determine tags and labels can generally be in more than one language. These expressions will therefore generally have different forms, and the system 100 can be configured appropriately to utilize these forms. For example, in French instead of looking for an expression of the form "I just bought X," the appropriate expression is of the form "Je viens d'acheter X."

EXAMPLES

The following are exemplary demonstration systems. TWEETCAST Your Vote predicts how people voted in the 2012 US Presidential campaign based on their tweets. LocalRx is a recommendation system that suggests local restaurants, bars, shops, and other business establishments to users based on their current (or hypothetical) location and their tweets. BookRx provides book recommendations to people based on their tweets. The following illustrates some of the ways in which the kinds of data and data-gathering methods described above could be used in different settings.

TWEETCAST Your Vote

In TWEETCAST Your Vote, natural language expressions of sentiment can be considered, both positive and negative, towards the two leading candidates: e.g., Barack Obama and Mitt Romney. A number of different expression patterns or phrases are determined, each varying slightly in word usage but otherwise unambiguously expressing a preference to one of the two candidates, such as:

I will vote for <candidate>
I will not vote for <candidate>

The former pattern expresses positive sentiment, the latter negative sentiment; and in each, <candidate> can be replaced with the name of either candidate (or their official TWITTER username). These represent an individual's voting intentions and serve as the tags in the system. This is treated as a binary classification problem, meaning that a negative expression of sentiment for one candidate was treated as positive towards the opposing one. The data meeting these patterns are gathered using TWITTER REST API, which allows to programmatically search for tweets by keywords and phrases.

Upon tagging a user, the system 100 collects their historical data—which includes a large set of tweets posted by that user prior to declaring support for either candidate—using once again TWITTER REST API. Each tweet includes the words and entities (hashtags, websites, and usernames) contained in the message. The system 100 can also have gathered tweets by that person posted after the declaration of support from which the tag is derived. Additionally, other data about these users may also have been utilized, such as data on their social network.

The system 100 represents users by the attributes in their historical TWITTER data, e.g., the unigrams and bigrams (one and two word phrases), hashtags, usernames, and websites contained in their tweets. The feature space was determined as the aggregate list of distinct attributes that appeared for at least two users in the dataset. Each user is then represented as an attribute vector with normalized binary values, depending on the presence or absence of the attribute in their tweets. Alternate approaches to determining and representing attributes of users based on their historical TWITTER data may also be considered.

Representing users in this way allows the system to learn patterns in their behavior by using machine learning algorithms. In the system 100, a logistic regression algorithm is trained on a corpus of labeled data (the users, as determined by their attributes, and their tags). The algorithm produces a logistic model that could be applied to new users—again as represented by attributes derived from their historical TWITTER data as described above—to generate probability scores, where the tag or label with the highest probably was then assigned as the preference (tag) for the new user. The system 100 could use the tweeting behavior of a new user, who had not explicitly declared his or her voting intentions, to predict which candidate they were most likely to vote for.

The system can also be used to develop characterizations of the interests, terms, media links and venues, and people followed by users who can be determined to have certain preferences or to have made certain choices based on their social media postings as described in the original application.

When initially invoked, the system 100 can produce a list of the most discriminant terms that distinguish, e.g., Romney voters from Obama voters. Expanding this model, the system 100 can determine the most frequent terms, hashtags, @-mentions, urls and web sites, and people followed, invoked by users who share a certain preference or choice as indicated by explicit linguistic expression in their social media posts (e.g., tweets). Thus, for example, if a large number of people who express a preference for or choice of a particular brand also mention a specific vacation destination or link to urls from a specific media site, then those terms and sites form a characterization of the kind of people who like that brand. This can be used to develop a demographic profile of those users in general, or to determine, e.g., search terms that would be useful to connect to advertising for that brand.

BookRx

BookRx uses a similar approach in gathering data and classification, however in this case with the goal of recommending books that users may find interesting. To tag users, the system 100 looked for expressions that were generated automatically on behalf of customers buying books on AMAZON, under their TWITTER user name, which are of the form: "I just bought: '<title of book>' by <name of author> via @ AMAZON <link>." There could also be more free-form expressions generated by users themselves as described earlier. The tag for that user is then determined as positive sentiment towards the product (book) and the set of categories into which the product falls. The system 100 can use AMAZON's product categories but any number of product taxonomies may be employed for this purpose.

Similarly to TWEETCAST Your Vote, BookRx represents users by attributes derived from their historical TWITTER behavior, in this instance the n-grams (unigrams, bigrams, and trigrams), hashtags, and usernames contained in their tweets. A difference between the two systems is that BookRx uses a two-stage classification process to first recommend categories of books, and then specific books within those categories.

To rank categories, the system trains a logistic regression model on a corpus of labeled data, that is, users represented as attribute vectors with normalized binary values, along with category tags or labels, generated from their historical TWITTER data as described above. The generated logistic model is applied to new users, again represented by attributes derived from their historical TWITTER data as described above, in order to rank the categories according to the generated probability scores. The top n categories relevant to new users, sorted by probability scores as determined by the model, are then presented to those users in that order.

Figure 3:
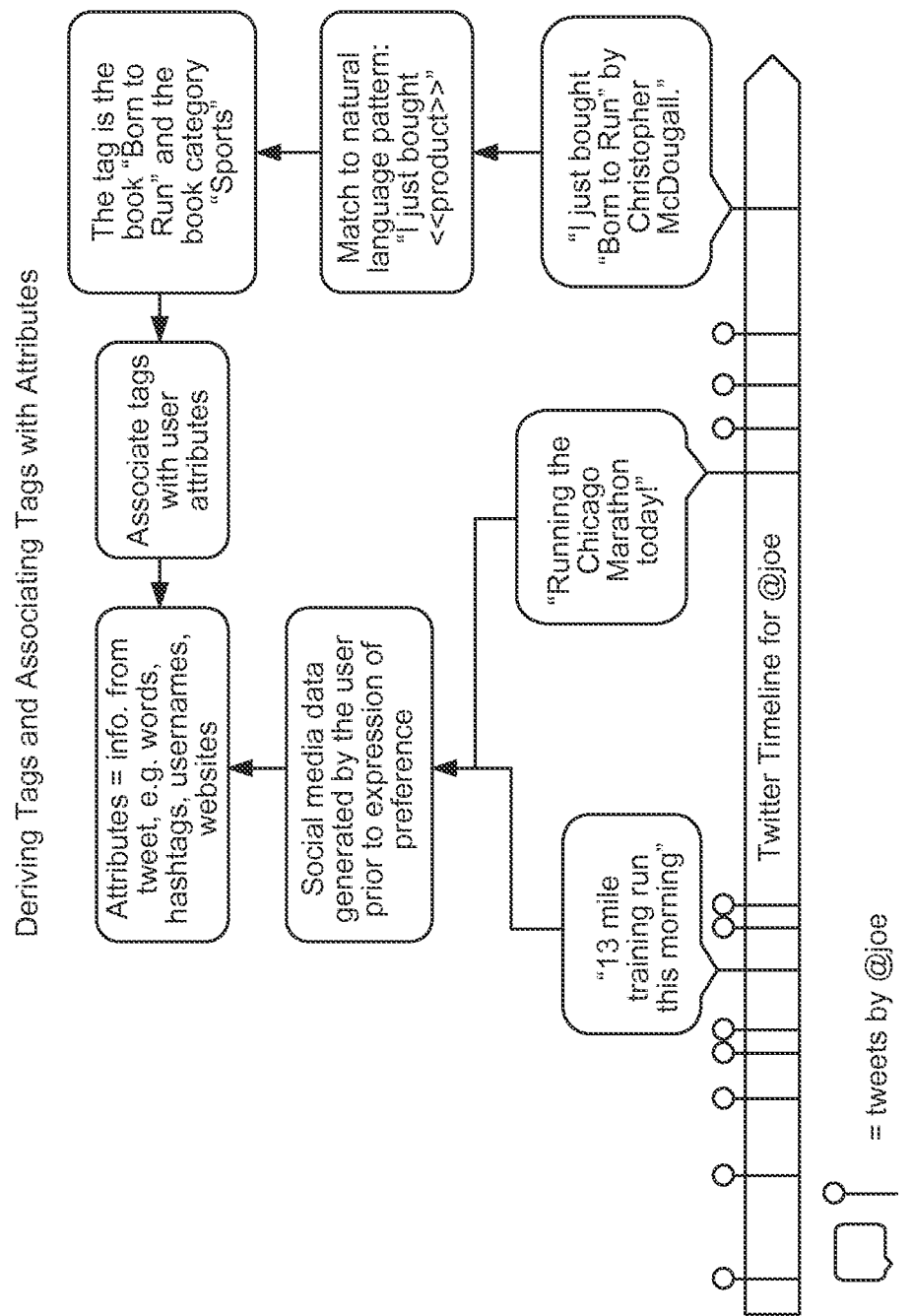
FIG. 3 provides an example of how tags are derived and how tags are associated with attributes.

FIG. 3 provides an example of how tags are derived and how tags are associated with attributes. An exemplary timeline of tweets for @joe is shown. Among the tweets are "13 mile training run this morning," "Running the Chicago Marathon today!," and "I just bought 'Born to Run' by Christopher McDougall." Social media data generated by the user @Joe is gathered prior to the expression of preference of the book. Attributes, e.g., information from the tweets are determined, including words, hashtags, usernames, websites, etc. The preference for the book can be determined from the match to the natural language pattern "I just bought <<product>>." The tag is the book "Born to Run" and the book category is "Sports," e.g., as determined from a database stored in memory 130. The tag can then be associated with the user attributes of @joe.

FIG. 4 provides an example of how users or composite models of users are represented. The users 1-N, e.g., @alex, @emily, @jocob, @michael, @william, etc. can be associated with attributes and tags. In the book example, the tags can include book names and categories, e.g., sports, business, technology, etc. The users can be represented as a vector of attributes: v=[A1, A2 . . . , An] where the value of each attribute is binary, one if the attribute is present in the user model, zero otherwise. The value v of each attribute can be weighted by the tf-idf (term frequency-inverse document frequency), or other, schema, e.g., that is intended to reflect how important a word is to a document in a collection or corpus. The tf-idf value increases proportionally to the number of times a word appears in the document, but is offset by the frequency of the word in the corpus, which helps to control for the fact that some words are generally more common than others.

Figure 5:
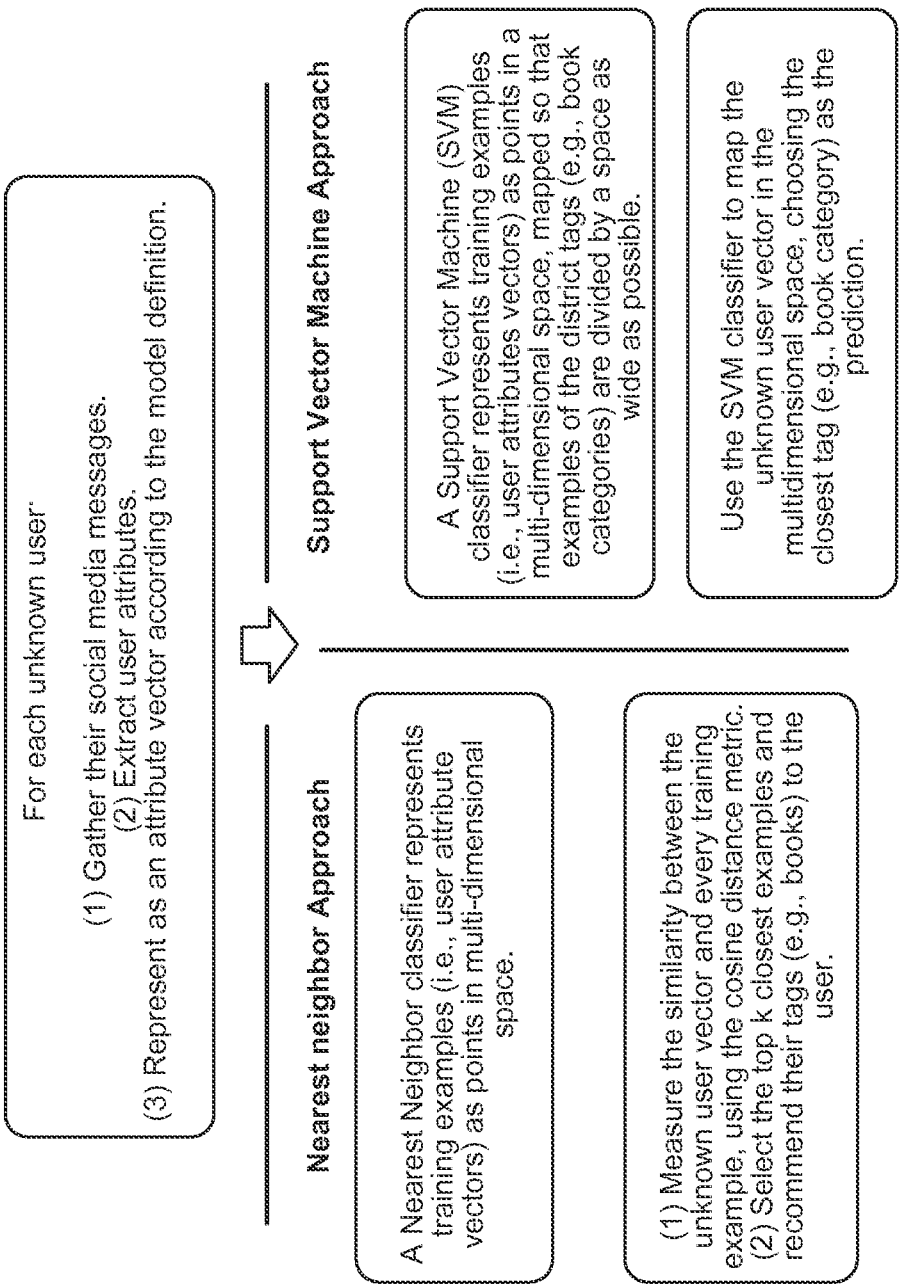
FIG. 5 provides an example of how users or composite models of users are represented.

FIG. 5 provides an example of how users not in the original set can be classified. The example is for BookRx, but can be used for other implementations as well. For each unknown user, social media messages are gathered, the user attributes are extracted, and the attributes are represented as an attribute vector according to the model.

For example, within each category, BookRx can use a nearest neighbor technique to recommend specific books. A nearest neighbor classifier represents training examples, e.g., user attribute vectors, as points in a multi-dimensional space. The similarity between the unknown user vector and each training example is measured, e.g., using the cosine distance metric. The top k closest examples are selected and their tags, e.g., books, are recommended to the user.

Each book category can be represented as a matrix, where each row in the matrix is a user tagged with that category. Each user is represented as an attribute vector of n-grams, hashtags, and usernames, as described above, where the value of each attribute is weighted according to the tf-idf schema, a popular method for measuring the importance of a term to a particular document. Again, using tf-idf—term frequency-inverse document frequency—a term is more important for characterizing a document or set of terms if it occurs more frequently in that document or term set, and less important if it also occurs frequently in many other documents or term sets. A new user is similarly transformed into a vector which is then is compared to each row in the matrix using the cosine distance metric (a standard model of similarity in information retrieval). The rows are sorted according to the computed distances and the books that serve as tags for the top n users most similar to the new user, representing their preferences, are then recommended to the new user.

In other cases, the comparison uses a support vector machine approach. A support vector machine (SVM) classifier represents training example, e.g., user attribute vectors, as points in a multi-dimensional space, mapped so that examples of the distinct tags, e.g., book categories, are divided by a space as wide as possible. The SVM classifier is used to map the unknown user vector in a multi-dimensional space, choosing the closest tag, e.g., book category, as the prediction.

A related notion concerns the use of behavioral models to determine advertising and other content seen by a user. If a particular content provider has a useful behavioral model of a given user, then that provider can serve targeted content aimed at the particular interests of that user. This works when the provider has such a model of the user in question. In an extension of the technology, given behavioral models can serve as the "tags" or "labels" associated with known users. Then other users, for whom the provider does not have behavioral models, can be ascribed such models, based on their similarity—as determined by their social media posts—to other specific users, or to aggregate models of such users, for which behavioral models are known. Behavioral models can be used as tags or labels to transfer the models to people for whom there is currently no model but who display similarity based on social media to people for whom there are models.

Another extension involves diversity of recommendation. The indications of preferences that can be found on social media can involve popular items, almost by definition. For example, the books that people talk about most are the most popular books—e.g., best-sellers. As a result, the direct application of machine learning and preference matching mechanisms as described above has a tendency to predict and recommend these most popular items (preferences). In some instances analysts or users may be interested in preference predictions and recommendations that are more diverse.

This can be addressed in a number of ways. The mechanism used to determine preference predictions can be extended to take additional parameters into account—for example, to adjust the distribution of the popularity of the predicted or recommended items in ways to include, e.g., some percentage of less popular results. The measure of popularity may be determined directly from the numbers of mentions in the social media data utilized by the system, or alternatively by using external data such as sales figures or best-seller lists. Another such parameter that may be usefully taken into account would be some measure of the quality of the item based on, e.g., rankings available from review sites or other sources. Multiple additional parameters can be used in this way.

Additionally or alternatively the data can be extended or sampled to address this issue. For example, data from the recent past can tend to reference currently popular items. Data from farther back in time can tend to reference items that were more popular during those periods. Using more historical data can therefore surface preferences and recommendations that are not necessarily popular at the current moment, while using more recent data can (almost by definition) surface those that are.

The set of items or preferences available for prediction or recommendation can in many cases be extended beyond simply those directly mentioned in the preference-indicating expressions available in the social media data. For example, as described above, it is reasonable and possible in many cases to generalize preferences from the items specifically mentioned in preference-indicating expression to the categories of those items. These categories in turn can be used to derive new specific preferences or recommendations, namely, other specific items in those categories.

More broadly, any model of similarity among items, not just category information, can be used to extend the set of preferences or recommendations. Thus, for example, for books, the system 100 may extend the set by including books by the same author as those mentioned directly in the social media data, or books whose plot summaries or textual descriptions are similar (using information retrieval (IR) measures of textual similarity), even if those books themselves are not mentioned in those data. It is possible to use a separate collaborative filtering system, based on entirely different data, to extend the range of preference predictions or recommendations.

There are a number of possible use cases for this technology. In one use case—exemplified by BookRx—users come to a site or invoke an application in order to get recommendations or indications of preference. In others, the system 100 constructed using this technology may be integrated into an e-commerce site or application, and the recommendations integrated in a relatively seamless fashion as part of a larger interaction model. The technology may also be used to directly contact users (e.g., via TWITTER) with specific offers or recommendations based on their predicted preferences. Other use cases may also be considered.

The necessary data, both attributes and, even preferences (tags or labels), can be mined from publicly available social media data sources, e.g., TWITTER. This obviates the need for access to proprietary data produced by, e.g., specific transaction systems or web publishing sites. Other open and publicly available sources of user-generated content, such as blog posts and comments on these and other forms of web content (e.g., product and restaurant review sites), could also be mined in this way for attributes and preference data of specific individuals. This approach could be utilized by a wide variety of preference-determining or recommendation systems in a wide variety of settings, including media and content recommendation, product recommendation, and preference prediction for market research.

Another extension of the technology again goes beyond the notion of using natural language expressions of preference or choice as the tags for social media data to be used by a recommendation or preference prediction technology. In this case, the tags are not expressions of preference or choice, but specific behavioral models deemed relevant to the given user.

These applications illustrate some of the ways in which social media data relating to individuals can be used to define attributes of those individuals usable by appropriate machine learning algorithms and preference matching schemes, and how their explicit natural language expressions of preference can be used to determine tags or labels for use by those algorithms or methods in order to predict preferences or make recommendations. Another example is LocalRx.

LocalRx

LocalRx is a recommendation system that suggests local restaurants, bars, shops, and other business establishments to TWITTER users based on their current (or hypothetical) location. The recommendations are personalized to an individual user by analyzing their TWITTER behavior. The content in a user's tweets (e.g., words, hashtags, usernames, and urls) are examined to find other TWITTER users that they are "similar" to, at least in terms of their tweeting behavior. The preferences of these other users with regard to restaurants, bars, or other local businesses are extrapolated to the original, similar user and make up the recommendations.

The system 100 is based on explicit linguistic expressions of preference or choice by users in social media postings are used as (or to determine) the tags or labels; some reasonably large set of other posts by those same users are then assigned those tags or labels, and used to determine attributes of other users who might share the same preferences. The system 100 identifies an initial pool of "training" users whose preferences can be inferred through data mining techniques. It searches TWITTER (or other social media platforms) for explicit expressions of preference that are directed toward a business establishment. An implementation of this technique includes a number of strict regular expression patterns that are used to find relevant tweets and extract the businesses mentioned within. An example of one such pattern and a matching tweet can be seen below:

Regular Expression Pattern (Python): I'm at (?P<Business>.+) \((?P<Location>[^\)]+\)

Matched Tweet: "I'm at Hopleaf Bar (Chicago, Ill.) w/4 others

Extracted Business: Hopleaf Bar

Extracted Location: Chicago, Ill.

These expressions include a user's declaration of their attendance or presence at a business, though it could be expanded to a broader set of statements containing positive opinions directed towards those businesses. For instance, a tweet such as "Just had dinner at Farmhouse in Evanston tonight and loved it" qualifies as well due to its unambiguous expression of positive preference towards that restaurant.

For each of the users that have been flagged by these methods, the system 100 collects their publicly available tweets via TWITTER APIs. These tweets are processed in order to extract specific types of features, including unigrams (e.g., words), hashtags, usernames, and urls. These attributes are associated with that particular user and are considered characteristic of a user who might like that same restaurant, bar, or business.

After a sufficient number of users and preferences have been identified according to the data mining techniques described above, the system can begin to make recommendations to new TWITTER users who have not explicitly uttered their preferences in the same way. LocalRx can use an indexing and search engine, e.g., Apache Lucene, or other indexing and search engine, to find similar users and to make recommendations. A traditional indexer refers to an indexed item as a "document", which contains a text field that is searchable. A text query calculates a similarity score to each document in the collection by a similarity function that typically uses the term frequency (the number of times that term appears in a document) and inverse document frequency (the inverse of the number of times that term appears in the collection).

The system 100 treats a user as a document and indexes the concatenation of all the user's processed tweets, which amounts to a large text field. A variation of this approach would be to index by venue rather than by user, so that the tweets of all users who visited one particular venue were concatenated and indexed as one document instead of individually. The same method can be used for constructing a query in either case: A new user's tweets are used to construct a query against the documents in the index, and the recommendations are drawn from the search results. For example, the system 100 recommends the top 10 businesses to each user as sorted by the Lucene scoring function.

The system interface can includes a map with recommendations overlaid as labeled pins with expandable information windows that provide more details on each recommendation. This metadata includes the name of the user that you have been matched with, the tweet or photo that the user posted at that establishment, and terms that you have in common with the matched user. The map interface was selected with a mobile device use case in mind, although it is possible to imagine other presentations as well, including organized lists of businesses.

Users can filter the recommendations by type of business; currently the available categories include "food", "drink", "arts", "recreation", and "shopping". An advantage of using Lucene is that the system can easily filter the recommendations by any indexed field, such as the business category and geographical area (a feature for a localized map interface). A specified local recommendation can be made based on the use of geo-location data.

In general terms, the system 100 treats the recommendation process as an instance-based learning problem, where new instances (e.g., users) are compared to existing instances so that the class (e.g., business) of the closest neighbor is assigned to the new instance. Therefore, other classification methods besides Lucene (or other indexing models) could be used for this same purpose, including a standard k-nearest neighbor algorithm. Other methods for finding similar users (or aggregated models of similar users) could also be applied. Tweets might be indexed individually in Lucene, and then aggregate counts and weights of matches could be determined to compute an overall similarity score. Or the data could be used as input to a variety of machine learning methods aimed at constructing categorizers based on the labeled data gathered as described above.

The explicit linguistic expressions of preference or choice may be generated naturally, by people, or automatically, by services used by those people (e.g., AMAZON, or FOURSQUARE). As discussed, the expressions generated automatically are easier to identify unambiguously because they fit a completely fixed format. However, there is an additional advantage to such automatically generated expressions. Not only are they easier to identify, but the specific product, service, organization, business establishment, etc., which they mention are usually referred to in terms that are entirely unambiguous. If a book, for example, the reference will include a pointer (url) to a web page that likely mentions the unique ISBN identifier of that book. If a business establishment, the reference will likely mention the address or some other distinguishing characteristic.

In the case of local businesses, the name of such a business may be (and often is) shared with other businesses located elsewhere or in a different realm of commerce. When the explicit linguistic expression of preference or choice is generated by, e.g., a FOURSQUARE check-in, on behalf of a user, this is essentially solved because the expression includes a pointer to information such as the address, business category, etc., that provides the necessary disambiguating or distinguishing information.

If the expression is generated naturally by the user him- or herself, however, such distinguishing information may need to be inferred. For example, the user may also mention an activity ("ate", "bought", etc.) or item ("shoes", "steak", etc.) that help disambiguate the appropriate referent of the name. The user's location, either as specified by the tweet or other social media posting (if geo-tagged), or directly in the tweet (if it also mentions, e.g., a neighborhood or street), or by his or her general location (as specified in, e.g., a user profile) may also be of help. Whatever the nature or source of this additional distinguishing information, an additional information source that provides business listings including name, category, address, etc., are used in order to fully disambiguate the referent of the name. The distinguishing features available in the social media posts, or associated with them or with the user who posts them, are used to narrow down possible matches within this listing in order to determine, if possible, an unambiguous referent.

The system uses a person's social media posts (e.g., tweets) to find similar users (or an aggregate model of such users) who like a particular local establishment. In the current system 100, the method for determining that these users like specific establishments is via the method of examining their explicit linguistic expressions of preference or choice. But the application, aimed at finding and recommending local businesses, restaurants, bars, cultural venues, etc., of interest to individual users, would also work in the case that the preferences or choices of these (previous) similar users are determined by more traditional methods—e.g., explicit signals in the social media system such as "following", "friending", "thumbs up", etc. A local recommendation can be provided when the tag or label is derived from traditional sources, e.g., explicit action within the social media system such as "friend", "follow" or "thumbs up."

Provided herein are systems and methods including: (a) collecting a first natural language expression from a first source; (b) identifying an expression of preference or choice in the natural language expression; and (c) determining a tag or label from the expression of preference or choice. In some cases the methods further comprise: (a) collecting a corpus of natural language expressions from a second source and (b) determining an attribute from the corpus of natural language expressions, wherein the attribute is indicative for preference of the tag or the label. The methods may also include analyzing nonlinguistic data to determine the attribute. The methods may also include determining a second attribute from the corpus of natural language expressions or nonlinguistic data, wherein the second determined attribute is indicative of preference for the tag or the label.

The first source and the second sources are the same in certain embodiments. In other embodiments the first source and the second source may be different. In certain embodiments the first source or the second source may be online sources. In other embodiments the first source and the second source may be social media.

The expression of preference or choice may comprise an event. Examples of events are transactions, purchases, and choices. In other embodiments the expression of preference or choice may comprise an object. Examples of objects include services, products, goods, companies, political opinions, policy opinions, or categories of any of the above objects. Additionally, the expression of preference or choice may comprise a positive sentiment, a negative sentiment, or a neutral sentiment.

An event may define a tag or label. In other embodiments an object may define a tag or label. In other embodiments the positive sentiment defines the tag or the label, the negative sentiment defines the tag or the label, or the neutral sentiment defines the tag or the label.

In certain embodiments nonlinguistic data may include links, usernames, websites, hashtags, metadata, or relationships.

In various cases attributes are components of vectors. The vectors may be normalized. The components of the vectors may be binary. In other cases the components of the vectors may be weighted by a term frequency-inverse document frequency schema.

Also provided herein are systems including: (a) a collection module configured to collect a first natural language expression from a first source; (b) an identification module configured to identify an expression of preference in the first natural language expression; and (c) a determination module to determine a tag or a label of the expression of preference. The systems may further comprise: (a) a collection module to collect a corpus of natural language expression from a second source and (b) a determination module to determine an attribute from the corpus of natural language expressions, wherein the determined attribute is indicative of preference for the tag or the label. In some cases the system may further include an analysis module for analyzing nonlinguistic data.

Additionally provided herein are computer readable storage media, the computer readable storage medium including one or more sets of instructions configured to direct a processor of a system to: (a) collect a first natural language expression from a first source; (b) identify an expression of preference in the natural language expression; and (c) define a tag or a label from the expression of preference. The media may further comprise one or more sets of instructions configured to direct a processor of a system to: (a) collect a corpus of natural language expression from a second source and (b) determine an attribute from the corpus of natural language expressions, wherein the determined attribute is indicative of preference for the tag or the label. Also the media my further comprise one or more sets of instructions configured to direct a processor of a system to analyze nonlinguistic data.

Further provided herein are methods for the prediction of a user preference, the methods including: (a) collecting a corpus of natural language expressions from a source; (b) determining an attribute from the corpus of natural language expressions, and (c) comparing the attribute to an attribute indicative for preference of a tag or a label. In some cases the comparison uses a nearest neighbor approach. In other cases the comparison uses a support vector machine approach. In yet other cases, the comparison may use a search engine or information retrieval indexing system, such as Lucene. In yet other cases, other machine learning approaches, such as logistic regression, may be employed for this purpose.

Also provided herein are systems including: (a) a collection module configured to collect a corpus of natural language expressions from a source; (b) a determination module configured to determine an attribute from the corpus of natural language expressions; and (c) a comparison module to compare the attribute to an attribute indicative for preference of a tag or a label.

Also provided herein are computer readable storage media, the computer readable storage media including one or more sets of instructions configured to direct a processor of a system to: (a) collect a corpus of natural language expressions from a source; (b) determine an attribute from the corpus of natural language expressions; and (c) compare the attribute to an attribute indicative for preference of a tag or a label.

While several embodiments have been described and illustrated herein, a variety of other means and/or structures for performing the functions and/or obtaining the results and/or one or more of the advantages described herein, and each of such variations and/or modifications is deemed to be within the scope of the embodiments. More generally, all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, the invention may be practiced otherwise than as specifically described and claimed. The claims are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope.

The indefinite articles "a" and "an," as used herein in the specification and in the claims, unless clearly indicated to the contrary, should be understood to mean "at least one."

It should also be understood that, unless clearly indicated to the contrary, in any methods claimed herein that include more than one step or act, the order of the steps or acts of the method is not necessarily limited to the order in which the steps or acts of the method are recited.

The invention claimed is:

1. A method, comprising:
performing collaborative filtering of user's linguistic expression in social media by a data processing device, the data processing device in communication to a network, and having at least a processor executing program codes stored in a memory, the method further comprising the data processing device performing:
collecting via the network, a first natural language expression, generated by a first user, from a first source as a first input of a current social media session;
collecting via the network, a second natural language expression, generated by the first user, from the first source or a second source as a second input of the current social media session;
concatenating with the processor, the first natural language expression and the second natural language expression into one new document specific to the first user which comprises a collection of words concatenated from the first natural language expression and the second natural language expression from the first source and the second source of the current social media session;
determining, with the processor, a plurality of attributes for the first user from the first and second natural language expressions in the one new document specific to the first user, where the plurality of attributes are determined without regard to an expression of preference or choice by the first user, the plurality of attributes comprising at least one of a username, website link and a hashtag generated by the first user;
identifying, with the processor, the expression of preference or choice in a third natural language expression by the first user, from the first source or the second source of the current social media session;
concatenating to include the expression of preference or choice in the third natural language expression of the first user into the one new document, such that all expressions of the current social media session from the first user are indexed and concatenated on the one new document;
associating, with the processor, a tag or a label to the identified expression of preference or choice of the current social media session from the one new document specific to the first user;
associating, with the processor, the associated tag or label with the plurality of attributes which were determined without regard to the expression of preference or choice, based on identifying the expression of preference or choice of the current social media session from the one new document specific to the first user, where the tag or label comprises a category of product;

associating, with the processor, the tag or the label with the plurality of attributes determined for the first user from the one new document of the current social media session, where the first user is represented as a vector of the plurality of attributes;

assigning, with the processor, the tag or label to a second user of the current social media session based on attributes of the second user matching the plurality of attributes of the first user using machine learning, wherein the attributes of the second user are determined based on identifying expressions of preference or choice of the current social media session from the second user which have been concatenated as another one new document which is specific to the second user; and displaying a recommendation on a device to the second user based on the assigned tag or label by the matching of the plurality of attributes of the current social media session of the second user from the another one new document specific to the second user to the plurality of attributes of the current social media session of the first user from the one new document specific to the first user.

2. The method of claim 1, wherein the first source and the second source are the same.

3. The method of claim 1, wherein the first source comprises an online source.

4. The method of claim 1, wherein the expression of preference or choice comprises an event.

5. The method of claim 4, wherein the event defines the tag or the label.

6. The method of claim 4, wherein the event comprises a transaction, purchase, or choice.

7. The method of claim 1, wherein the expression of preference or choice comprises an object.

8. The method of claim 7, wherein the object comprises a category of services, a category of products, a category of goods, a category of companies, a category of political opinions, or a category of policy opinions.

9. The method of claim 8, wherein the object defines the tag or the label.

10. The method of claim 1, wherein the attribute is represented as a component of a vector.

11. The method of claim 10, wherein the component of the vector is weighted by a term frequency-inverse document frequency schema.

12. The method of claim 1, further comprising:
extracting a positive or negative sentiment from a first natural language expression; and
defining the tag or label for the user with the positive sentiment.

13. The method of claim 1, further comprising building a predictive model based on the tag or the label.

14. The method of claim 13, further comprising assigning the tag or the label to a new user based on the predictive model.

15. The method of claim 1, further comprising:
collecting, with the processor, a corpus of natural language expressions, generated by a second user, from the second source; and
determining, with the processor, an attribute from the corpus of natural language expressions;
categorizing, with the processor, the attribute with other attributes previously associated with a tag or label; and
associating, with the processor, the tag or label with the second user.

16. The method of claim 1, further comprising:
assigning, with the processor, the tag or the label to a new user who has not explicitly declared a first preference or choice.

17. The method of claim 1, further comprising:
determining the tags or labels using at least one of nearest neighbor, linear regression or support vector machines.

18. The method of claim 1, wherein identifying a first preference or choice comprises at least one of identifying key words, sentiment or a plurality of regular expressions.

19. The method of claim 1, further comprising overlaying a map with the recommendation as labeled pins with expandable information windows that provide more details on the recommendation.

20. A method, comprising:
performing collaborative filtering of user's linguistic expression in social media by a data processing device, the data processing device in communication to a network, and having at least a processor executing program codes stored in a memory, the method further comprising the data processing device performing:
collecting via the network, a corpus of natural language expressions, generated by a user, from a source as an input of a current social media session;
concatenating with the processor, the corpus of natural language expressions into one new document specific to the first user which comprises a collection of words concatenated from the first natural language expression and the second natural language expression from the first source and the second source of the current social media session;
determining, with the processor, an attribute for the user from the corpus of natural language expressions in the one new document specific to the user, where the attribute is determined without regard to an expression of preference or choice by the user, the attribute comprising at least one of a username, website link and a hashtag generated by the user;
identifying in the one document specific to the user, with the processor, the expression of preference or choice in the corpus of natural language expressions of the current social media session generated by the user;
concatenating to include the expression of preference or choice in the natural language expression of the user into the one new document, such that all expressions of the current social media session from the user are indexed and concatenated on the one new document;
associating, with the processor, a tag or a label to the identified expression of preference or choice in the one new document specific to the user;
associating, with the processor, the associated tag or label with the attribute in the one new document specific to the user which was determined without regard to the expression of preference or choice, based on identifying the expression of preference or choice, where the tag or label comprises a category of product;
associating, with the processor, the tag or label with the attribute in the one document specific to the user which is determined for the user from the one new document of the current social media session, where the user is represented as a vector of attributes;
comparing, with the processor, the attribute of the user to an attribute of another user using machine learning, wherein the attribute of the another user is determined based on identifying an expression of preference or choice of the current social media session from the another user which has been concatenated as another new document which is specific to the another user;

displaying a recommendation on a device to the user based on the comparison of the attributes to the other user and the tag or label by the matching of the attribute of the current social media session of the another user from the another one new document specific to the another user to the attribute of the user from the one new document specific to the user.

21. The method of claim 19, wherein the attribute is a composite attribute that comprises two or more attributes determined from the corpus of natural language expressions for the user.

22. The method of claim 20, further comprising providing geo-locating data for a local recommendation.

23. The method of claim 20, wherein a local recommendation is derived from a social media action including a follow, friend or thumbs up.

24. The method of claim 20, further comprising:
    extracting a positive or negative sentiment from a first natural language expression; and
    defining the tag or label for the user with the positive or negative sentiment.

25. The method of claim 20, further comprising overlaying a map with the recommendation as labeled pins with expandable information windows that provide more details on the recommendation.

* * * * *